United States Patent [19]
Bilei et al.

[11] Patent Number: 5,335,636
[45] Date of Patent: Aug. 9, 1994

[54] ENGINE COMPRISING A CONTINUOUS BRAKING DEVICE, PARTICULARLY FOR AN INDUSTRIAL VEHICLE

[75] Inventors: Mario Bilei, Settimo Torinese, Italy; Stefan Kirschner, Munich, Fed. Rep. of Germany; Takeo Ogawa; Kazuaki Noritou, both of Saitama, Japan

[73] Assignees: Iveco Fiat S.p.A., Turin, Italy; Nissan Diesel Motor Co., Ltd., Saitama, Japan

[21] Appl. No.: 972,648

[22] Filed: Nov. 6, 1992

[30] Foreign Application Priority Data

Nov. 8, 1991 [IT] Italy .................. TO91 A 000859

[51] Int. Cl.⁵ ........................................... F02D 13/04
[52] U.S. Cl. .......................................... 123/321
[58] Field of Search ............... 123/90.16, 90.17, 90.22, 123/90.4, 320, 321, 347

[56] References Cited

U.S. PATENT DOCUMENTS

| | | | |
|---|---|---|---|
| 3,367,312 | 2/1968 | Jonsson | 123/321 |
| 3,547,087 | 12/1970 | Siegler | 123/321 |
| 3,572,300 | 3/1971 | Stager et al. | 123/321 |
| 3,786,792 | 1/1974 | Pelizzoni et al. | 123/321 |
| 4,440,126 | 4/1984 | Abermeth et al. | 123/321 |
| 4,836,162 | 6/1989 | Melde-Tuczai et al. | 123/321 |
| 4,909,035 | 3/1990 | Tadokoro et al. | 60/602 |
| 4,932,372 | 6/1990 | Meneely | 123/321 X |
| 5,146,890 | 9/1992 | Gobert et al. | 123/321 |

FOREIGN PATENT DOCUMENTS

| | | | |
|---|---|---|---|
| 2391358 | 12/1978 | France . | |
| 62307 | 4/1983 | Japan | 123/321 |
| 1250612 | 10/1971 | United Kingdom . | |
| 1279977 | 6/1972 | United Kingdom . | |

*Primary Examiner*—Willis R. Wolfe
*Attorney, Agent, or Firm*—Bacon & Thomas

[57] ABSTRACT

Endothermic engine for an industrial vehicle includes a continuous braking device capable of actuating a supplementary opening of the exhaust valves so as to dissipate the compression energy produced inside the cylinders, in which the profile of the exhaust valves control cams consists of a first section with null lift, corresponding to one stage of the suction stroke of the relevant cylinders, a second section with a constant reduced lift, corresponding to the last stage of the suction stroke and to both compression and power stroke of the relevant cylinders, and a third lobe section corresponding to the exhaust stroke of the respective cylinder. The continuous braking device includes an actuator capable of displacing rotation axis of control rocker arms of exhaust valves from a first normal work position, in correspondence to which valve clearance is large enough to cause second section of the cams profile to be ineffective, and a second braking position, in correspondence of which the value of valve clearance is reduced in such a way, as to activate the second section.

12 Claims, 5 Drawing Sheets

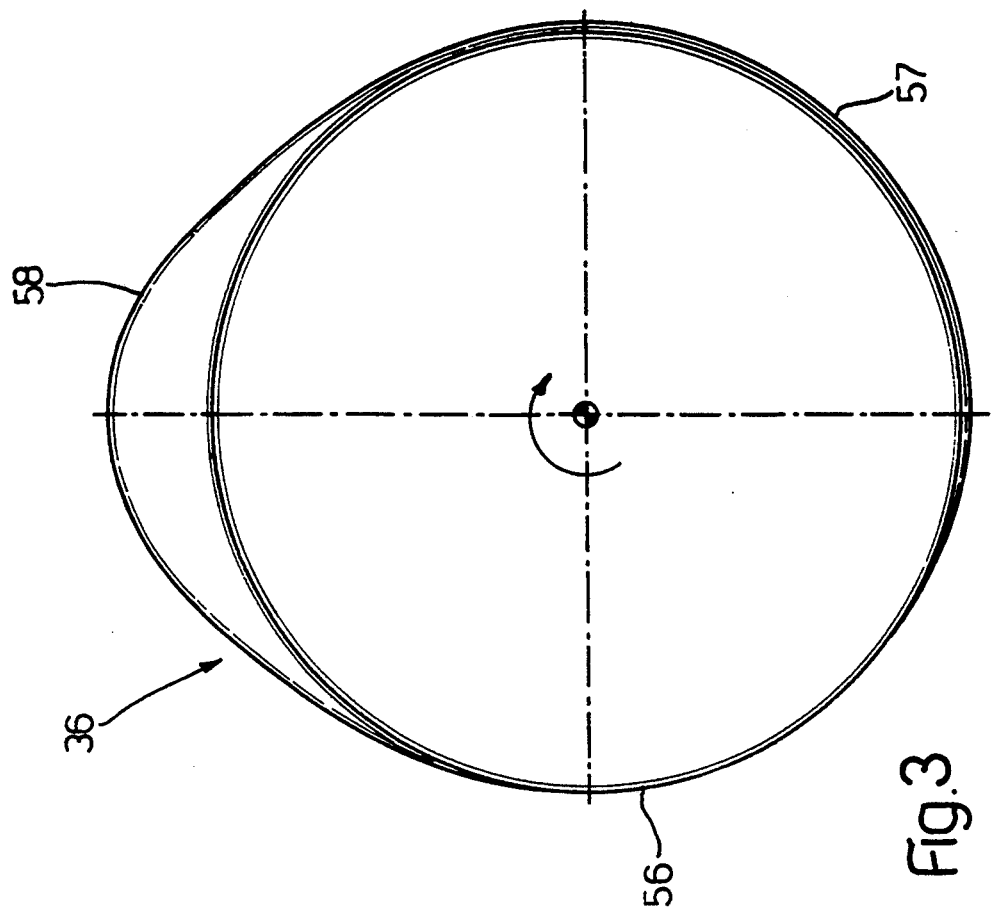
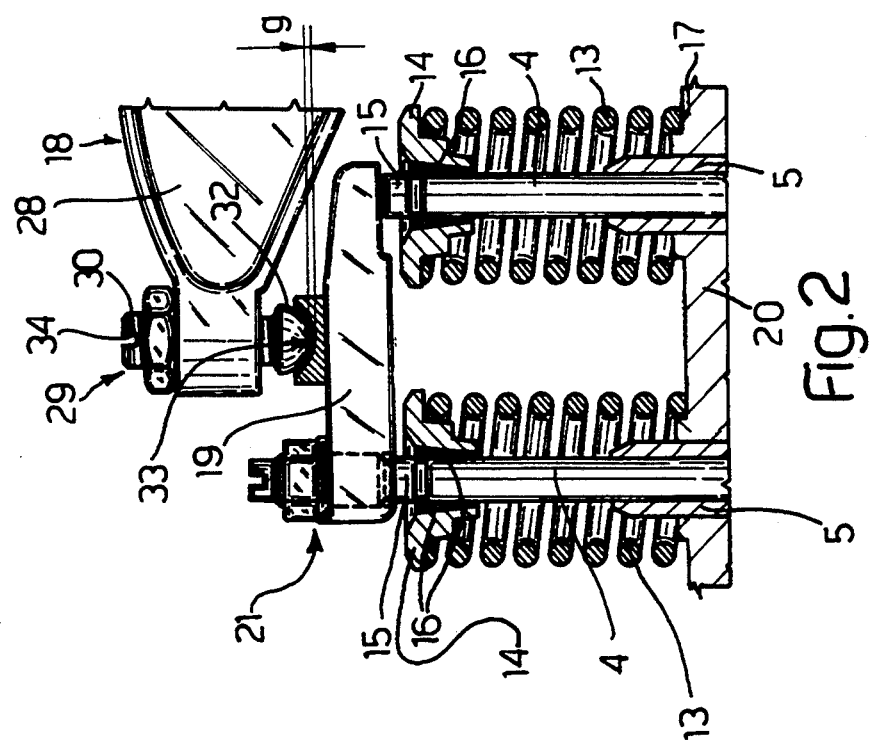

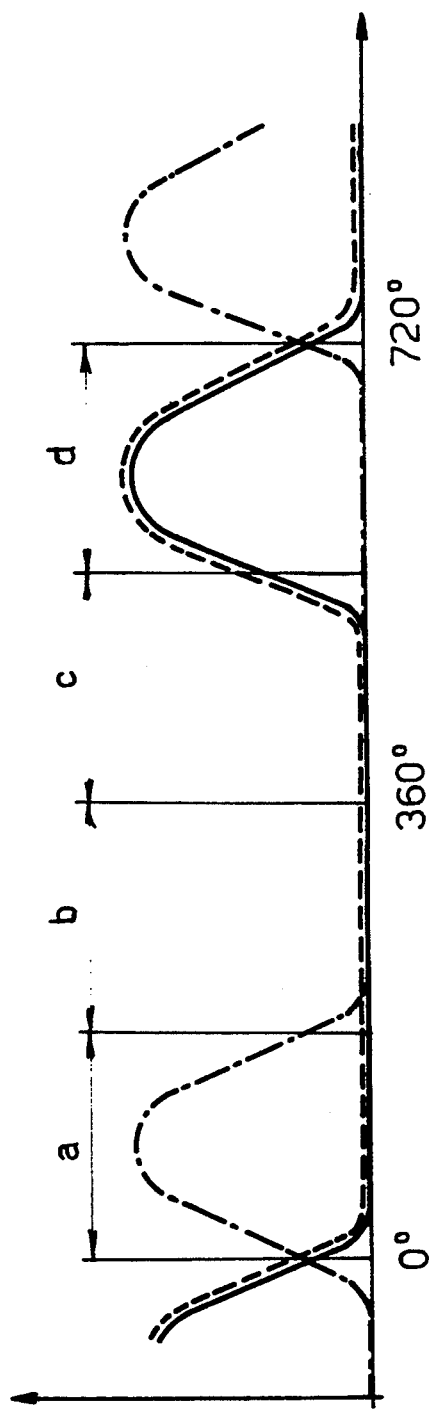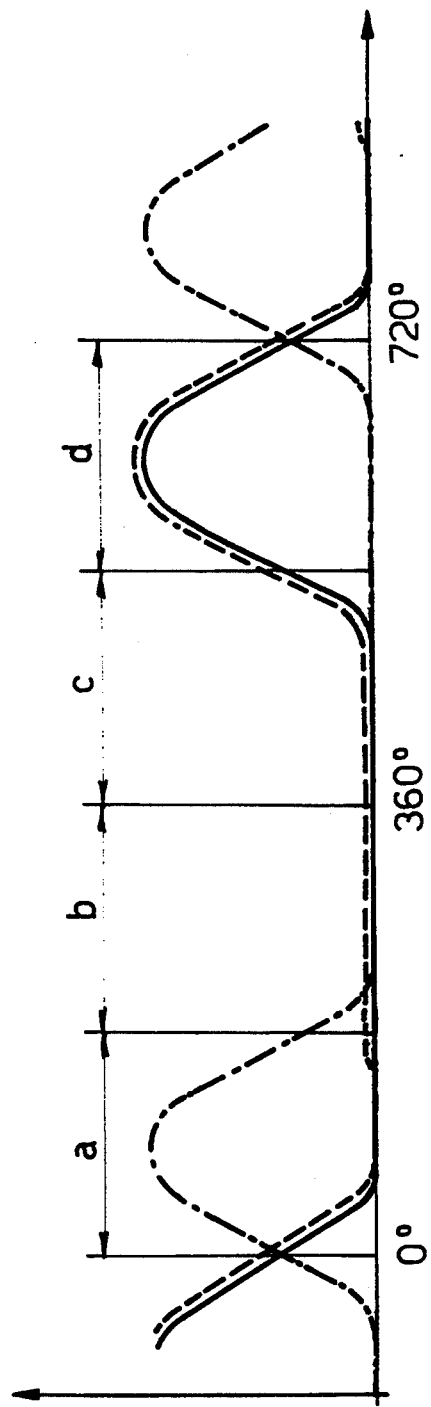
Fig.6
Fig.7

ENGINE COMPRISING A CONTINUOUS BRAKING DEVICE, PARTICULARLY FOR AN INDUSTRIAL VEHICLE

BACKGROUND OF THE INVENTION

The present invention relates to an engine comprising a continuous braking device, particularly for an industrial vehicle. As is known, industrial vehicles must be fitted with a continuous braking device, besides service and parking brakes. Such a device aims, by exploiting the braking capacity of the engine when in use, to guarantee a continuous deceleration of the vehicle on long slopes, without resorting to service brakes. The ever increasing rate of progress in supercharging allows for engines having higher and higher working power, with equal displacement, and, therefore, for ever heavier vehicles being pulled. Therefore, the engine braking capacity, as well, should increase proportionally, so that the braking power/active power ratio be constant, as much as possible. To this end, over the past few years engines have been fitted with continuous braking devices based on the principle of dissipating the engine compression energy in order to generate braking power. In such well-known engines, said dissipation is achieved by opening the exhaust valves at the end of the compression stroke; the effectiveness of such a solution being increased by the supercharging provided by the turbine, thus causing the compression power, and therefore, the braking power, to be increased. Being the turbine of a centrifugal type, its contribution decreases along with the speed of the engine; therefore, the effectiveness of the known devices is reduced at low engine speed, whereas a high braking torque at low speed should be desirable. Other engines are also known, each cylinder of which presents an additional exhaust valve, open during each stroke of the cycle. The effectiveness of such a further solution being increased by the use of a throttle valve on the exhaust manifold, which generates an exhaust back pressure inside same manifold. Quite a high braking power can be obtained in such a way; however, the maximum braking power to be obtained is limited by the air flow rate through the engine being reduced and, therefore, by the temperature inside the combustion chambers being increased.

SUMMARY OF THE INVENTION

Aim of this invention is the embodiment of an engine comprising a continuous braking device for an industrial vehicle, so as to overcome such drawbacks as are connected to the above described known systems. Such an aim being achieved by this invention, in that it relates to an endothermic engine for an industrial vehicle, comprising:

a plurality of cylinders, each comprising at least one exhaust valve capable of intercepting an opening communicating with an exhaust manifold;

at least one camshaft comprising a plurality of control cams of said exhaust valves by means of the relevant rocker arms oscillating about their axis; and a continuous braking device capable of actuating the supplementary opening of said exhaust valves so as to dissipate the compression energy produced inside said cylinders, characterized in that said cams profile presents a first section with null lift, corresponding to one stage of the suction stroke of the relevant cylinders, a second section with a constant, reduced lift, corresponding to the last stage of the suction stroke and to both compression and power stroke of the relevant cylinders, and a third lobe section corresponding to the exhaust stroke of said relevant cylinders, said continuous device comprising first actuating means capable of displacing said rocker arms axis from a first normal operation position, in which the value of the clearance between said rocker arms and said valves is high enough to cause said second section of said cams profile to be ineffective, to a second braking position, in which the value of said clearance is reduced, so as to activate said second section of said profile.

BRIEF DESCRIPTION OF THE DRAWINGS

The present invention will be better described by way of a non-limiting example, with reference to the accompanying drawings, in which: FIG. 2 is a section side elevation view of a part of FIG. 1; FIG. 3 shows a schematic view of an improved type cam of the engine in FIG. 1; FIG. 6 is a diagram showing the law of the valves lift of an engine comprising a device such as the one provided for herein, having conventional cams; FIG. 7 is a diagram showing the law of the valves lift of an engine comprising a device such as the one provided for herein, having modified cams.

DETAILED DESCRIPTION OF THE INVENTION

Figure 1:
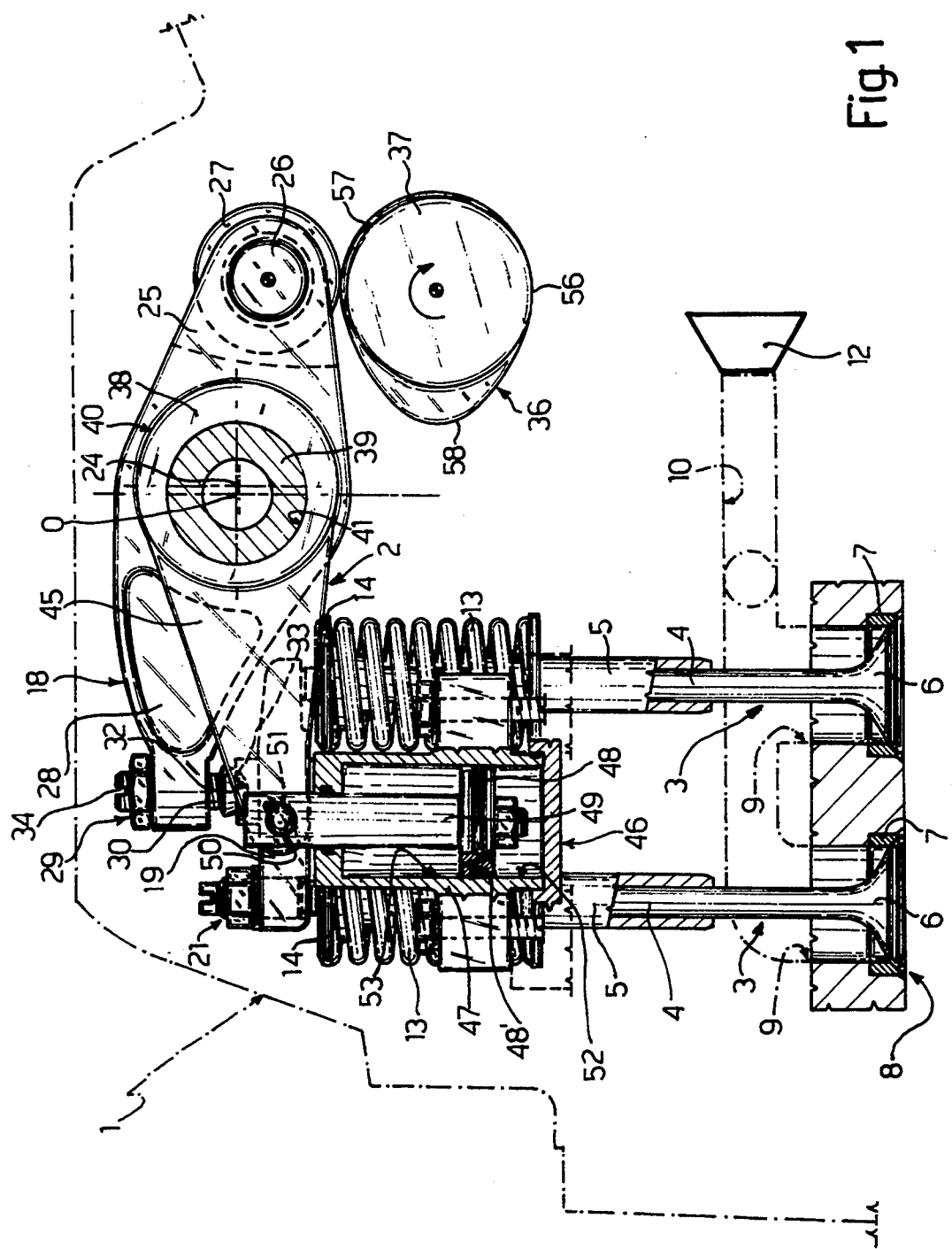
FIG. 1 is a partial side elevation and partial section view for an industrial vehicle comprising a continuous braking device as obtained according to the present invention.
Figure 4:
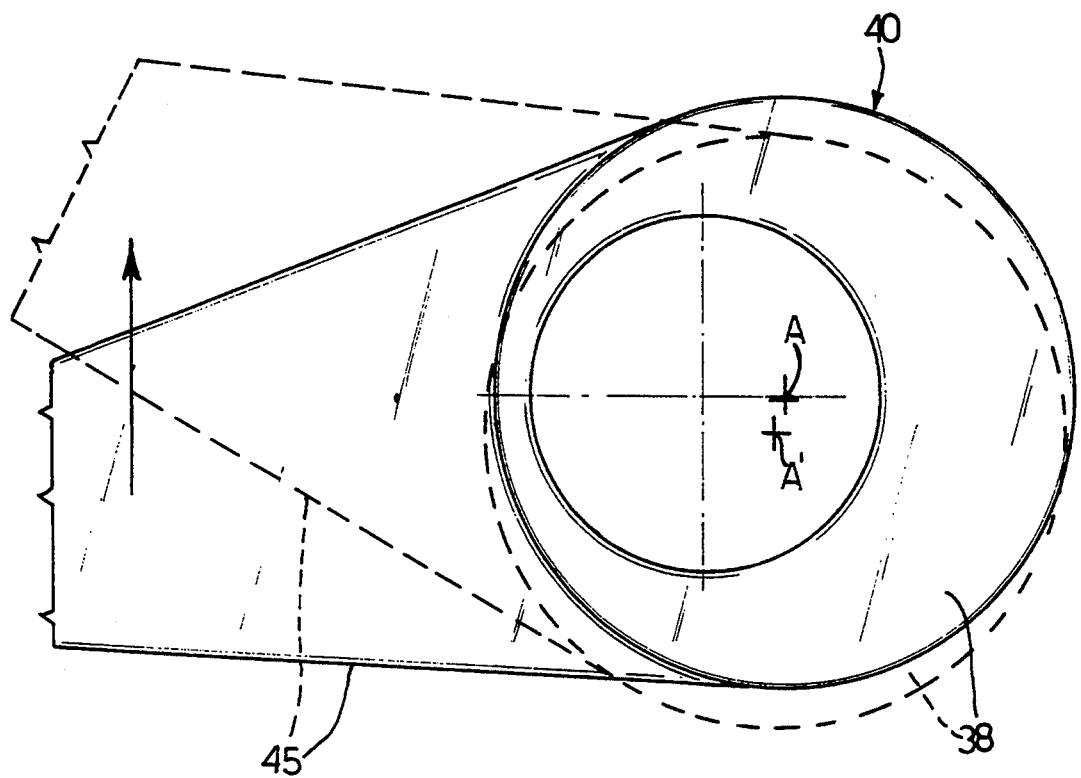
FIG. 4 is a schematic elevation view of an operating lever of the device as shown in FIG. 1, in two different working positions.
Figure 5:
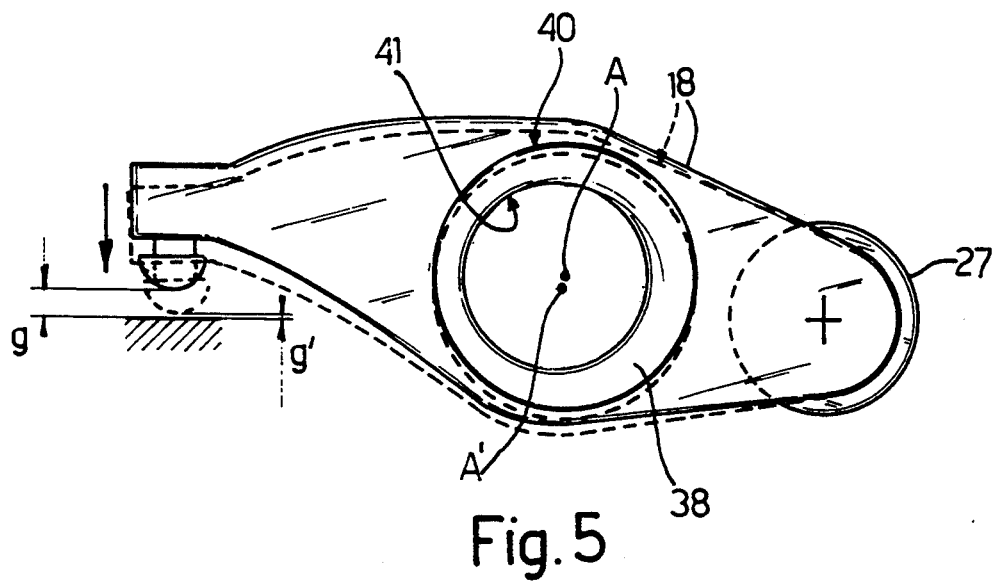
FIG. 5 is a schematic side elevation view of a rocker arm of the device as shown in FIG. 1, in two different operating positions.
Figure 8:
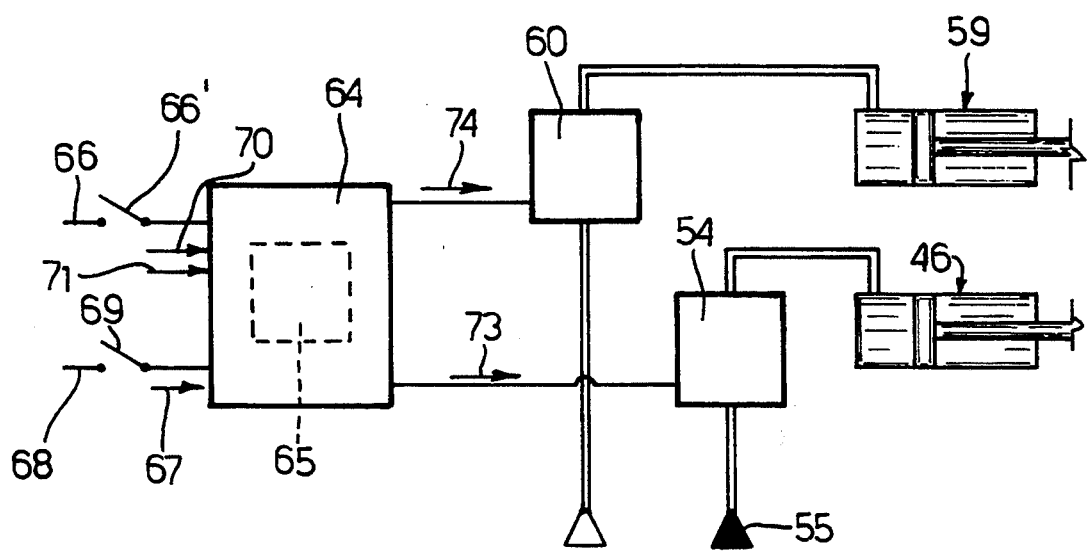
FIG. 8 shows a scheme of an operation electric-fluidic circuit of the device as shown in FIG. 1.
Figure 9:
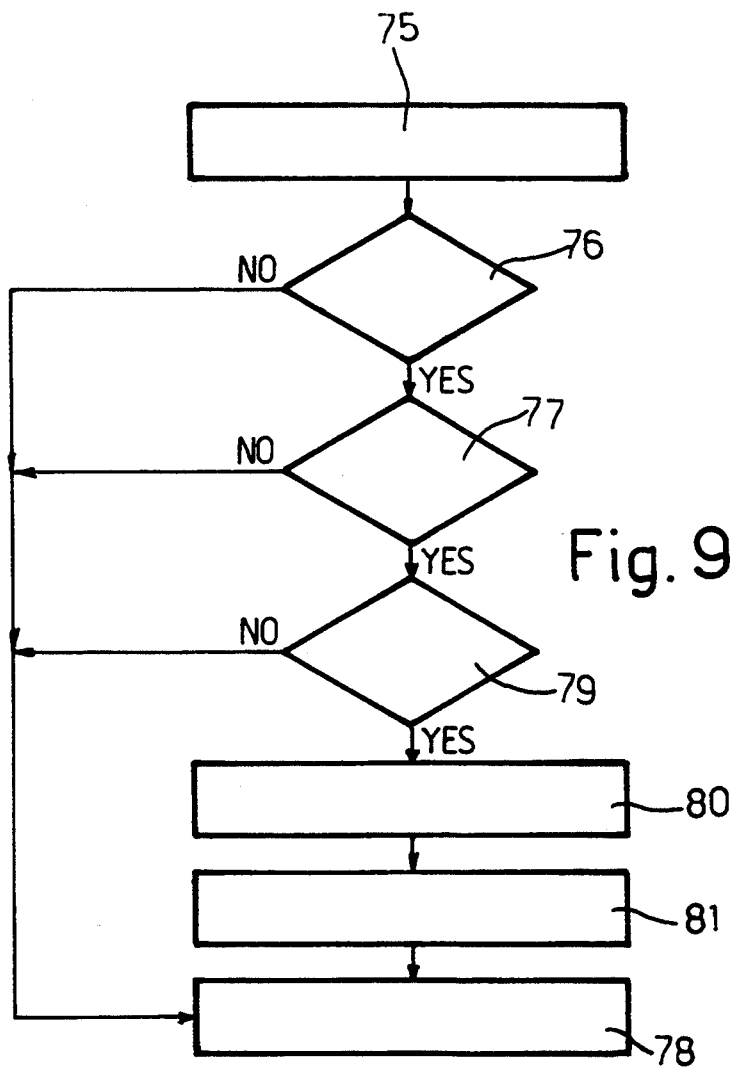
FIG. 9 is a control flow chart of the device shown in FIG. 1.

With reference to FIG. 1, numeral 1 refers to an endothermic engine of an industrial vehicle, conveniently of the supercharged Diesel type, fitted with a continuous braking device 2. Engine 1, details of which are not shown, being its structure already well known, comprises a plurality of cylinders, each fitted with feed valves (non shown in FIG. 1), along with a couple of exhaust valves 3. FIG. 1 shows valves 3 of a single cylinder, as well as those parts of device 2 in charge of said valves control; both the valves of the other cylinders and the relevant parts of device 2 being obviously fully similar to those shown and hereinafter described in detail. As well known, each valve 3 comprises a stem 4 sliding along the axis inside a fixed tubular guide 5 and an end head 6 cooperating with a seat 7 to close a communication opening between a combustion chamber 8 of the cylinder and an exhaust duct 9. Exhaust ducts 9 of valves 3 of each cylinder, schematically shown with a hatched line, join in exhaust manifold 10. A turbine 12, serially connected to exhaust manifold 10, drives, in a well-known manner, a supercharger of said engine (not illustrated). Each valve 3 is held in a closing position, in a well-known manner, by a spring 13, coaxial with stem 4 of same valve. Said spring (FIG. 2) being compressed between cap 14, integral with end 15 of stem 4, said end being opposite head 6, due to a couple of cotters 16, and the engine head. Both valves 3 are controlled by a common rocker arm 18, hereinafter described in detail, by means of a cross member 19 cooperating with end 15 of relevant stems 4. Cross member 19 comprising screw adjustment means 21, of a conventional type, the latters being capable of ensuring coplanarity of both contact surfaces and valves stems and, consequently, simultaneity of intervention of same valves. Rocker arm 18 oscillates about its axis 24, orthogonal to the plane containing the axes of valves 3. Said rocker arm having a first fork arm 25, supporting pin 26, whose axis is parallel to axis 24 of same rocker arm, fitted with roller 27, lying idle, and a second arm 28 fitted, on one of its ends, with adjustable element 29, capable of cooperating with cross member 19. More in detail, said element 29 substantially comprises valve clearance adjusting screw 30, its axis lying orthogonal to axis 24 and on the same plane with the valves axes, said screw being screwed into threaded hole 31 of second arm 28 of rocker arm 18 and being fitted with hemispherical end head 31, facing cross member 19 and capable of cooperating with a matching hemispherical seat 33 of same cross member. One end of screw 30, opposite head 32, is fitted with a groove 34 for an adjustment tool and is held in the chosen position by means of a nut 35 fastened on rocker arm 18. Roller 27 of rocker arm 18 cooperates with its respective cam 36 of a camshaft 37 of engine 1; such a camshaft clearly comprising a plurality of identical cams (which are not shown), displaced with respect to one another through a suitable angle, capable of controlling the other cylinders exhaust valves, as well as a plurality of cams (which are not shown, either), capable of controlling the suction valves. It is to be pointed out that the phrase "valve clearance" employed herein refers to the limited idle stroke that rocker arm contact element, in the present case, head 32, must complete, to get into contact with its respective thrust element of valves 3, in the present case, seat 33 of cross member 19, starting from a null lift position of its respective cam (or from any other position, if specified). According to the present invention, continuous braking device 2 substantially comprises, for each rocker arm, an eccentric bush 38 fitted onto a fixed rocker arm bearing axis 39, whose geometrical axis is represented by letter 0; said bush 38 supports, radially and in an angularly free manner, its respective rocker arm 18 on the rocker arm bearing axis 39. More specifically, bush 38 (FIG. 4) presenting an outer cylindrical surface 40 onto which rocker arm 18 is mounted, its axis therefore coinciding with rotation axis 24 of rocker arm 18, and an axial eccentric clearance hole 41 housing rocker arm bearing axis 39, its axis therefore coinciding with axis O. A radial operating lever 45, capable of allowing eccentric bush 38 to rotate about rocker arm bearing axis 39, originates from one end of said bush, integral to it, in the neighbourhood of a minimum thickness area of same bush. When motor 1 is in normal operation, i.e., in the absence of continuous braking, axis 24 of rocker arm 18 substantially lies on the horizontal plane passing through axis 0 and on the same side as camshaft 37, with respect to the latter; axis 24 in the described position being indicated by A in FIG. 4. Device 2 further comprises a hydraulic actuator 46, consisting of a cylinder 47 with a vertical axis fitted to the head of the engine in the neighbourhood of valves 3 and a piston 48 sliding inside said cylinder and defining inside it two chambers 52,53, upper chamber and lower chamber, respectively. Drive rod 49, integral to piston 48, projects from said cylinder 47 upwards. Rod 49 is connected to one of its ends, which bears the already mentioned operating lever 45 by means of a pin 50, whose axis is parallel to axis 0, born by same rod 49, which engages an elongated groove 51 obtained on one end of lever 45. Said groove 51 conveniently slants, downward and toward the end of lever 45, with respect to a horizontal plane passing through the axis of pin 50, by an angle substantially equal to the angular excursion of same lever 45. Piston 48 comprises a clearance hole 48', having an oblique axis, so as to allow fluid to flow by between chambers 52,53 of the cylinder. Lower chamber 52 of cylinder 47 is connected, via a duct 51 obtained on the same wall of said cylinder and not shown in FIG. 1, to first valve means 54 (FIG. 8), electrically controlled, that are, in their turn, connected to a source 55 of compressed fluid, conveniently engine oil. According to a further characteristic of the present invention, control cams 36 of exhaust valves 3 have a modified profile, shown in detail in FIG. 3. Such a profile essentially consists of a first section 56 with null lift (that is, defined by a portion of the cam base circle), substantially corresponding to most suction stroke of the relevant engine, a second section 57 with a constant reduced lift, having an angular width equivalent to the last stage of the suction stroke and to compression and power strokes, and a third convex lobe section 58, substantially corresponding to the exhaust stroke and defining a valves lift law of the conventional type. Section 56,57 and 58 of the profile are obviously connected one to the other in such a way as to avoid high acceleration of rocker arm 18. Valves clearance adjustment by means of screw 30 is not carried out with reference to the base circle, as in the case of conventional profile cams, but with reference to second section 57 of cam 36. With the engine in normal operation, therefore, valve clearance is quite small, equivalent to the optimal adjustment value obtained when roller 27 of rocker arm 18 cooperates with second section 57 of cam 36, a clearance g (that is to say, one distance between head 32 and its respective seat 33 of cross member 19 ), on the contrary, being noticeably bigger when roller 27 of rocker arm 18 cooperates with first section 56, i.e., with the base circle, of cam 36. According to a further characteristic of the present invention, turbine 12 is of the variable geometry type, so as to yield the highest possible efficiency as exhaust gases rate varies. Said variation in the turbine geometry being achieved, in a conventional way and, as such, not shown herein, by means of a pneumatic actuator 59 (FIG. 8), controlled by a second group of electrically controlled, proportional response valves means 60, connected to a source 64 of compressed air. Both first and second valves means, 54 and 60, respectively, are piloted by an electronic control unit 64 comprising microprocessor processing means 65, through relevant signals 73,74. Control unit 64 is connected to an electric feed line 66 through a switch 66', operated by the starter key and to which line 68 conveys an input signal 67, said line 68 being fitted with a bistable switch 69 which can be operated manually to insert the continuous braking device, conveniently by means of a push button located on the control board in the cab. A further input signal 70 is conveyed to control unit 64, indicating the engine revolution speed, originating, e.g., from any type of known speed sensor, as well as an input signal 71, indicating the position of the accelerator pedal. FIG. 9 shows a logic block diagram of both actuator 46 and turbine 12 control cycle, carried out by control unit 64. From a starting block 75 we go on to a first check block 76 of the state of signal 67; if the latter is active, that is, if switch 69 has been operated by the operator, a subsequent evaluation block 77 of signal 71 is reached, if not, an end-of-cycle block 78. Should signal 71 correspond to the released condition of the accelerator pedal, a subsequent block 79 is reached, comparing the value of signal 70 to the reference values stored in control unit 64. Particularly, said comparison is carried out with a couple of reference values, equivalent, e.g., to 60% and 120%, respectively, of the engine maximum power speed. If signal 70 falls within such a bracket of reference values, subsequent activation blocks 80 and 81 are reached, respectively, of control signal 73 of the first valve means 54 and of control signal 74 of the second valve means 60, and, from these, on to end-of-cycle; if not, end-of-cycle is reached directly from block 78. In particular, the value of signal 74, generated by control unit 64, depends on the value of signal 70 and/or on the value of other parameters received by control unit 64, according to a map stored in the same control unit. Device 2 and the relevant parts of engine 1 operate as follows. In normal use, hydraulic actuator 46 of device 2 is not active; piston 48, therefore, lies at its bottom endof-stroke position, while operating lever 45 and bush 38 are in such a position as previously described and shown in FIG. 1 and FIG. 4 by the cross-hatched section. FIG. 5 shows—cross-hatched section—the matching minimum lift position of rocker arm 18, revolving on axis A. Operation of actuator 46, according to the previous description, is conditional upon the following combination of conditions: activated switch 69, released accelerator pedal and engine speed between 60% and 120% of maximum power speed. Said operation causes rod 49 to project and, therefore, operating lever 45 and eccentric bush 38 to rotate about axis 0. Bush 38 moves to such position as illustrated in FIG. 4—hatched section—and axis 24 of the rocker arm is therefore displaced, by translating, parallel to itself, along a circumference with radius 0, into position A'. The lowering of hinge axis 24 of rocker arm 18 (FIG. 5, hatched section) causes valve clearance g to be reduced. In particular, the dimensions of the different parts of system 2 are such, that clearance g is almost completely recovered, that is to say, that a very limited clearance g' is maintained, equivalent to the optimal adjustment value, with roller 27 cooperating with section 56 (base circle) of cam 36. At the end of the operating stroke of actuator 46, that is to say, when the resisting load on rod 49 is at its highest, groove 51 is horizontal; under such a condition, therefore, the radial component of said load on same rod is null. The engine automatically reverts to its normal operation condition, by disconnecting system 1 by means of switch 69. In the absence of hydraulic feed to actuator 46, the forces acting on rocker arm 18 (essentially, the elastic forces of springs 13 of valves and the moments of inertia) are enough to cause bush 38 to revert to its normal operation position. The aim of hole 48' in piston 48 of actuator 46 is that of keeping up the oil level in upper chamber 53 of cylinder 47, so as to create a stabilizing effect of same piston with actuator 46 in a non-active position. The diagram of FIG. 7 shows the effects of the intervention of device 2 on valves 3 lift. Said diagram shows, on the x-coordinates, the values of the drive shaft rotation angle from the beginning of the suction stroke, and, on the y-coordinates, the values of the exhaust valves lift and, for mere reference's sake, of the suction valves lift (hatched-dotted curve). Letters a, b, c and d indicate, the suction, compression, power and exhaust stages, respectively. In particular, the solid curve illustrates the engine normal operation, device 2 not being active. Under such conditions it is easy to notice that second section 57 of cam 36, with constant reduced lift, does not affect valves 3 at all, since, on the grounds of the hereinabove, with reference to valve clearance adjustment, the lift supplied by said section causes only clearance g to be recovered. During exhaust stroke, third section 58 of cam 36 causes valve 3 to open and subsequently close again, in quite a conventional manner. The hatched curve, instead, represents the lifts pattern, should device 2 be operated. In such a case, since clearance g is substantially recovered by varying the position of axis 24 of rocker arm 18, the valve lift is still null only during suction stroke, with roller 27 of rocker arm 18 cooperating with section 56 (base circle) of cam 36; prior to the beginning of the compression stroke, i.e., when the active area of cam 36 moves from section 65 on to section 57, exhaust valves 3 opening corresponds to the lift of section 57. Valves 3 are held in the above reduced and constant lift position during compression and power strokes; lift patterns during exhaust stroke being the conventional ones, determined by section 58 of cam 36, said lift increasing slightly and constantly owing to device 2 causing clearance to be reduced. Operation of device 2 having been explained from the kinematic point of view, its effects on the engine cycle can now be taken into study. During suction stroke, exhaust valves 3 are closed. This prevents warm gases, compressed by the exhaust, from flowing back, which would cause active work on the piston, thus allowing the braking power deriving from the piston (negative) suction work to be fully exploited The diagram contained in FIG. 6 shows, for comparison's sake, the law of valves lifts in an engine fitted with such a continuous braking device as according to the present invention, but presenting conventional profile cams, i.e., a circular, constant radius profile, save for section 58. The solid line representing, like in FIG. 7, the lift pattern in normal use, the hatched line representing said pattern after operation of system 2. By comparing the diagram of FIG. 6 with that of FIG. 7, it is possible to observe that, during suction stroke, exhaust valve opens, with consequent above drawbacks. Slightly before bottom end-of-stroke, exhaust valves open, thus allowing gases to flow back from the exhaust manifold; which causes a supercharging effect, that is to say, the additional filling of the cylinder. Such an effect, which lasts throughout the first stage of the compression stroke until the inner pressure of the cylinder is equal to that of the exhaust manifold, being particularly convenient at low engine speed, as it allows for a higher compression power ( and, consequently, for a higher braking power), thus offsetting the turbine lower efficacy at low speed. During compression stroke, exhaust valves are open so as to dissipate the compression energy by causing it to flow from the cylinder to the exhaust manifold, consequently reducing pressure inside the cylinder. During power stroke, the opening of the exhaust valve allows for the compression energy dissipation to be completed and, during its final stage, for the gas to be drawn from the exhaust, thus making suction pressure inside the cylinder to decrease and, consequently, oil consumption to be reduced, as well, said oil flowing back into the cylinder owing to said suction pressure. During exhaust stroke, exhaust valves are open in the conventional manner so as to allow the gases contained inside the cylinder to be moved toward the exhaust manifold. During said exhaust stroke, the engine yields more braking power in order to overcome the back pressure created inside the exhaust manifold by turbine 12. Variable geometry turbine 12, whose structure is already well known, is used and governed so as to generate a considerable pressure inside the exhaust manifold: said pressure causes the cylinders to be supercharged through the exhaust valves at the end of both suction and power strokes, as previously said, thus increasing the braking power generated during exhaust stroke. Furthermore, said turbine pulls, as it is well-known, the supercharger, thus supplying the mechanic energy needed for the air to be compressed inside the suction manifold; the larger the quantity of drawn air, the bigger the dissipated compression power and, consequently, the higher the braking power. The foregoing clearly bearing proof of the advantages connected to engine 1, thanks to both the use of device 2 and to the particular configuration of cams 36. In particular, high braking power can be obtained at low engine speed, as well, with additional supercharging, but without any detrimental overheating of the combustion chambers. Finally, such alterations and changes, as may fall within the scope of protection of the present invention, can obviously be made to hereinabove described engine 1. In particular, manual control means of the analogic type can, for instance, be provided for, so as to allow said braking power to be regulated by modifying the geometry of turbine 12. Moreover, said turbine may be replaced with a conventional, fixed geometry turbine, or else, with a throttle valve in the exhaust manifold. Finally, the number of the engine cylinders, the number of valves for each cylinder, as well as the specific embodiment manner of the control of same valves, may be changed.

We claim;

1. An endothermic engine (1) for an industrial vehicle, comprising:
   a plurality of cylinders, each fitted with at least one exhaust value (3) capable of intercepting an opening communicating with an exhaust manifold (10);
   at least one camshaft (37) fitted with a plurality of cams (36) controlling said exhaust valves (3) by means of respective rocker arms (18) oscillating about their axis (24); and
   a continuous braking device (2) capable of controlling an additional opening of said exhaust valves (3) so as to dissipate the compression energy produced inside said cylinders,
   wherein said cams (36) each have an associated profile including a first section (56) with null lift, corresponding to one stage of the suction stroke of said respective cylinders, a second section (57) with constant, reduced lift, corresponding to the last stage of the suction stroke and to both compression and power strokes of the relevant cylinders, and a third lobe section (58) corresponding to the exhaust stroke of the relevant cylinders, aid continuous braking device including first actuating means (46) capable of displacing said rocker arms (18) from a first normal operation position (A), in correspondence of which the value of clearance (g) between said rocker arms (18) and said valves (3) is high enough, to cause said second section (57) of the profile to be ineffective, to a second braking position, in correspondence of which the value (g') of said clearance is so reduced, as to activate said second section (57) of said profile.

2. An engine as claimed in claim 1, wherein said rocker arms (18) are articulated on a fixed axis (39) by means of at least one eccentric bush (38).

3. An engine as claimed in claim 2, wherein said continuous braking device (2) comprises at least one operating lever (45), integral with said eccentric bush (38).

4. An engine as claimed in claim 3, wherein said actuating means comprise at least one fluid actuator (46), connected to said operating lever (45), so as to actuate a rotation of said eccentric bush (38) about said fixed axis (39).

5. An engine as claimed in claim 4, wherein said hydraulic actuator (46) employs engine oil as working fluid.

6. An engine as claimed in claim 4, wherein said fluid actuator comprises a piston (48) fitted with at least one clearance hole (48') so as to cause a working fluid to flow by.

7. An engine as claimed in claim 6, further comprising a rod (49) connected to said operating lever (45) by means of a pin (50) sliding inside an elongated groove (51) obtained on one end of said operating lever (45); said groove (51) slanting so as to be horizontal when said operating lever (45) is pivoted by said actuator (46).

8. An engine as claimed in claim 1, further comprising pressurization means (12) of said exhaust manifold (10).

9. An engine as claimed in claim 8, wherein said pressurization means comprises a turbine (12) for the supercharging of same engine.

10. An engine as claimed in claim 9, wherein said turbine (12) is of the variable geometry type.

11. An engine as claimed in claim 10, further comprising second fluid actuating means (59) governing the geometry of said turbine (12).

12. An engine as claimed in claim 11, further comprising first valve means (54), electrically controlled, for operating said first actuating means (46), second valve means (60), electrically controlled, for operating said second valve means (59), and electronic control means (64) for controlling said first and second valve mean (54, 60).

* * * * *